(12) United States Patent
Bierweiler et al.

(10) Patent No.: US 12,411,483 B2
(45) Date of Patent: Sep. 9, 2025

(54) METHOD AND SYSTEM FOR DIAGNOSING MESSAGES

(71) Applicant: Siemens Aktiengesellschaft, Munich (DE)

(72) Inventors: Thomas Bierweiler, Karlsruhe (DE); Jean Pascal John, Munich (DE); Daniel Labisch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 270 days.

(21) Appl. No.: 17/913,872

(22) PCT Filed: Mar. 23, 2021

(86) PCT No.: PCT/EP2021/057393
§ 371 (c)(1),
(2) Date: Sep. 23, 2022

(87) PCT Pub. No.: WO2021/191190
PCT Pub. Date: Sep. 30, 2021

(65) Prior Publication Data
US 2023/0341844 A1    Oct. 26, 2023

(30) Foreign Application Priority Data
Mar. 26, 2020    (EP) .................... 20165820

(51) Int. Cl.
*G05B 23/02*    (2006.01)
(52) U.S. Cl.
CPC ................. *G05B 23/024* (2013.01)
(58) Field of Classification Search
None
See application file for complete search history.

(56) References Cited

U.S. PATENT DOCUMENTS

| | | |
|---|---|---|
| 6,414,594 B1 | 7/2002 | Guerlain |
| 7,388,482 B2 | 6/2008 | Dousson et al. |

(Continued)

FOREIGN PATENT DOCUMENTS

| | | |
|---|---|---|
| CN | 107729985 | 2/2018 |
| DE | 102012004854 | 9/2013 |

(Continued)

OTHER PUBLICATIONS www.iosb.fraunhofer.de/servlet/is/22544/Paper_ICIT2012_Frey.pdf?command=downloadContent&filename=Paper_ICIT2012_Frey.pdf.

(Continued)

*Primary Examiner* — Alvaro E Fortich
*Assistant Examiner* — Carl F. R. Tchatchouang
(74) *Attorney, Agent, or Firm* — Cozen O'Connor

(57) ABSTRACT

Method and system for diagnosing messages generated during operation of a technical plant, wherein data sets and a predetermined self-organizing map are used to determine diagnostic statements on the operation of the plant, n-tuples corresponding to the data sets and containing predetermined values for process variables for error-free operation of the plant are stored at nodes of the self-organizing map, after a message has occurred minimum distances between data sets of the current time interval and data sets of the nodes of the self-organizing map are determined, and the corresponding node(s) is/are selected, symptoms are then determined by calculating differences between the data sets of the time intervals and the previously determined node(s), only differences of process variables exceeding a predefined threshold value being taken into account, and where process variables involved in previously determined symptoms are output such that a plant operator is supported in diagnosing a process message.

23 Claims, 3 Drawing Sheets

(56) References Cited

U.S. PATENT DOCUMENTS

| | | | | |
|---|---|---|---|---|
| 8,768,664 | B2* | 7/2014 | Swanson | G05B 17/02 |
| | | | | 703/6 |
| 9,696,336 | B2* | 7/2017 | Jain | G01P 15/18 |
| 9,928,342 | B1* | 3/2018 | LaBorde | G06N 3/048 |
| 10,848,514 | B2* | 11/2020 | Christian | G06N 99/00 |
| 2010/0145978 | A1 | 6/2010 | Anashkin et al. | |
| 2014/0046881 | A1 | 2/2014 | Loesl et al. | |
| 2018/0031587 | A1 | 2/2018 | Bierweiler et al. | |
| 2018/0046917 | A1 | 2/2018 | Bierweiler et al. | |
| 2020/0117179 | A1* | 4/2020 | Lutz | G05B 15/02 |

FOREIGN PATENT DOCUMENTS

| | | |
|---|---|---|
| EP | 2696251 | 2/2014 |
| EP | 3279756 | 2/2018 |
| EP | 3454154 | 3/2019 |

OTHER PUBLICATIONS

Ng Y. S. et al. "A self-organizing map approach for process fault diagnosis during process transitions", Aiche Annual Meeting, pp. 1-12, 2004.

Von Birgelen Alexander et al: "Anomaly Detection and Localization for Cyber-Physical Production Systems with Self-Organizing Maps: Intelligent Methods for the Factory of the Future"; Kommunikation und Bildverarbeitung in der Automation: Technologies for Intelligent Automation: Ausgewählte Beiträge der Jahreskolloquien KommA und BVAu 2018, Springer Berlin Heidelberg, Berlin, Heidelberg; Jan. 1, 2018 (Jan. 1, 2018).

PCT International Search Report dated Jun. 14, 2021 based on PCT/EP2021/057393 filed Mar. 23, 2021.

* cited by examiner

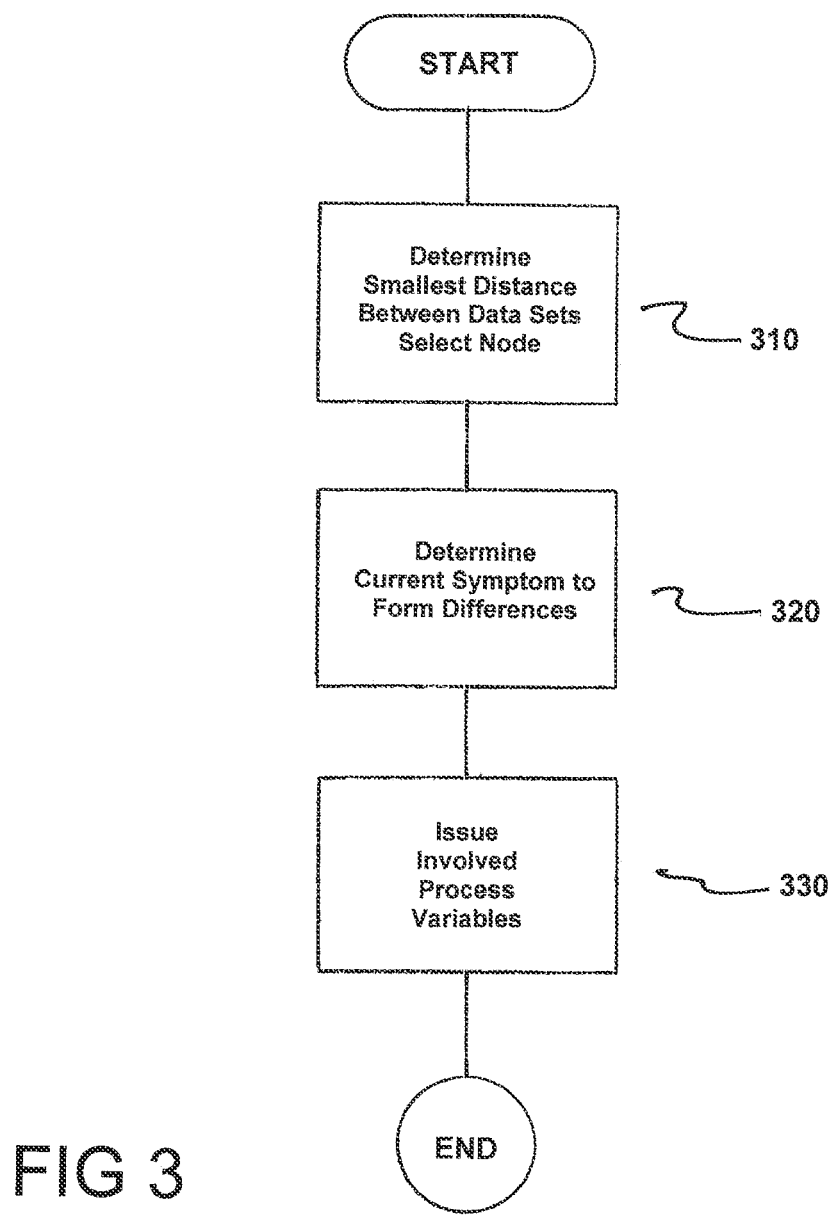

METHOD AND SYSTEM FOR DIAGNOSING MESSAGES

CROSS-REFERENCE TO RELATED APPLICATIONS

This is a U.S. national stage of application No. PCT/EP2021/057393 filed 23 Mar. 2021. Priority is claimed on European Application No. 20165820.0 filed 26 Mar. 2020, the content of which is incorporated herein by reference in its entirety.

BACKGROUND OF THE INVENTION

1. Field of the Invention

The invention relates to a system and method for diagnosing messages of a process control system with an associated computer program, where the messages are generated during an operation of a technical plant, and where the technical process running within the plant is controlled via a process control system.

2. Description of the Related Art

Technical processes are controlled via an automation system in production and process plants. The sequence of individual production steps or the process engineering process can be subject to production-dependent fluctuations as well as fluctuations caused by errors within the technical plant. It is therefore necessary to monitor such sequences for safe operation and the fulfilment of qualitative targets. This must differentiate between unusual, error-based deviations and normal production or process fluctuations. Such unusual, error-based deviations are known as anomalies.

The presence of an anomaly is a binary statement in principle, which is however often combined with at least one further value, such as a value that quantifies the deviation from the normal.

When an anomaly exists, the scalar awareness of this anomaly will however not suffice to understand the same and to plan the next steps. The provision of a symptom is important. Symptoms are indicators for or signs of a deviation from the normal status. In VDI/VDE Guideline 2651, sheet 1, "Plant Asset Management (PAM) within the Process Industry" of May 2017 the term of a symptom is explained on page 19: Symptoms are therefore deduced from features (i.e., characteristic parameters, such as pressure, temperature or filling level) through comparison with reference parameters. The feature "winding temperature of a motor" is thus, for example, not a symptom on its own, because the absolute value says nothing about a possible overload. Only the comparison with the maximum admissible value or a reference value (for example, a nominal value) supplies a statement regarding a deviation. Symptoms can thus, for example, be deduced through comparison with target, limit, nominal or empirical values, through trend monitoring or comparison with models.

A subsequent diagnosis or investigation of cause will evaluate the symptoms as results of monitoring. The influences or process variables which cause the symptom are calculated.

Process messages generated by the automation system will alert the operator of processing plants to error-based deviations from normal operation. In addition to operator interventions by a user (operating messages), process messages in particular characterize a departure of individual process variables from a normal range (warnings), a reaching of critical values (alarms) and diagnosis information of an automation system (system messages). Alarm messages particularly require an immediate, or at least timely action of the operator of a technical plant due to the critical nature, in order to prevent loss of quality, loss of production, plant failure and, as a worst case scenario, accidents involving personnel.

Alarms therefore constitute one of the most important aids in process engineering plants for monitoring the process by an operator and for detecting deviations from normal operation. Alarms are normally implemented as fixed or variable limit values on measured or deduced parameters (calculated from other measured parameters). If the limit value is exceeded, then the operator is alerted via an alarm.

In many cases, the information of the alarm is, however, not sufficient on its own to be able to comprehend in detail the deviation of a parameter from its target value, or the occurrence of an alarm will be even less sufficient to recognize the reason for the deviation of a parameter from its normal value. An error often triggers several alarms, which complicates the requirement of timely identifying a correct reaction further. In a worst case scenario, the incorrect intervention by the operator can even increase the deviation of a parameter from its normal value and lead to a catastrophe.

For this reason, the operator must first analyze what has triggered a process message before being able to deduce suitable measures. The operator must analyze various measured values, time sequences and KPIs to find the reason. Depending on the message and the cause, these will however differ, so that it will not be possible to allocate the relevant ones an alarm already at the start. The navigation to various values at the operator station on different overview displays takes time, and a misreading of components or signals is possible.

Depending on the problem, a detailed analysis is however essential, in particular given an increased technical interdependency of linked part processes. It would therefore be especially desirable if individual signals and/or process variables could be determined as a reason for triggering a message.

SUMMARY OF THE INVENTION

In view of the foregoing, it is therefore an object of the present invention to provide a method for diagnosing process messages of a process control system of a technical plant, a corresponding suitable system, computer program and computer program product, characterized by an improved cause analysis of occurring messages.

This and other object are achieved in accordance with the invention by an improved method for diagnosing messages generated during an operation of a technical plant in a process control system, where the method uses self-organizing maps, with which the normal behavior of the plant operation can be illustrated and thus determined, for determining a diagnosis statement. By way of a purely data-driven determination of the behavior of the respectively examined data sets for specific time intervals, which behavior deviates from the normal operation of the plant, causes that lead to a triggering of a message, and thus to the deviating behavior of the plant operation, can advantageously be determined in a more precise and more reliable way.

"Self-organizing maps", Kohonen maps or Kohonen networks (after Teuvo Kohonen; SOM or self-organizing feature map, SOFM) are sufficiently known from the prior art. According to Wikipedia dated Feb. 20, 2020, self-organizing maps describe a kind of artificial neuronal networks. As a non-monitored learning method, they are an efficient data mining tool. Their functional principle is based on the biological discovery that many structures in the brain have a linear or planar topology. In the essay "Monitoring of Complex Industrial Processes based on Self-Organizing Maps and Watershed Transformations" by Christian W. Frey, Fraunhofer Institute IOSB, found on the internet on Mar. 11, 2016 at the address, a diagnosis method is known for monitoring complex industrial processes, in which a self-organizing map is trained for an error-free behavior of the process with the aid of process variables, namely with the aid of the recorded values of measured variables, and the values of control variables issued for the process. The later operating behavior is compared with the learned error-free behavior with the aid of the self-organizing map predetermined in accordance with the above essay. A deviating behavior is recognized in this way, which can then be analyzed for causes and possible errors during the operation of the process.

EP 3 279 756 B1 also discloses a diagnosis facility and a method for monitoring the operation of a technical plant, in which reliable diagnosis statements are obtained through use of one or more self-organizing maps during step chain control.

Prior to use of a self-organizing map, the same must be taught with "good data". In an automatic learning process, several data sets characterizing an error-free operation of the plant are stored for every node of the self-organizing map in the data memory and with the aid of these data sets through the learning process the n-tuples are calculated and stored with the values of the process variables for an error-free operation for the nodes of the map, which means allocated to the nodes. The map predetermined in this way can be used directly for further analyses. In order to teach the self-organizing map, values of the process variables of a normal, error-free operation are used as training data. The self-organizing map stores typical values of the process variables for the normal operation as good values at each node while teaching. At the start of the teaching process, a map of a size of 8×12 nodes can, for example, be used. It should be understood sizes that differ from this can also be used. Following teaching, the training data can be used for checking the map size. The new type of diagnosis therefore advantageously requires minimal knowledge of the operator of the plant to be monitored and can be used practically universally. If, during diagnosis operation, values of the process variables differ too much from the good values stored at the nodes of the previously taught self-organizing map, then this constitutes an indication of an error in the monitored plant. Only a subsequent analysis of the cause of the error may require more detailed knowledge of the respective processes running on the monitored plant.

The invention makes use of the following for message diagnosis:

In its most simple embodiment during a first step the data sets of the process variables of the current time interval, during which the message occurred, are investigated to find the range of the SOM in which they are located, i.e., where in comparison to normal operation, which is characterized by the nodes of the SOM, the current data sets are located. This is realized through determining the smallest distance between the data sets of the current time interval and the data sets of all nodes of the self-organizing map.

The mathematical distance measure can be randomly chosen here. A Cartesian distance or a Manhattan distance, for example, can be used for the distance between two points.

The node resulting from this calculation is now selected as reference for the subsequent symptom determination. This reference node is often also described as the winner neuron, or winner node, as it would correspond to the current normal operation of the plant, i.e., an error-free operation. The symptom relevant for the current time interval is determined in that differences are formed from the data sets of the current time interval for the previously determined reference node, where only the differences of process variables that exceed a predetermined threshold value are considered. The process variables that are involved in the previously determined symptoms are issued. The method in accordance with the invention therefore makes it possible in the present embodiment to determine the process variables that are characteristic for the current plant condition and supports the plant driver in their diagnosis of a process message. The same advantage applies for a corresponding system for the diagnosis of messages of a process control system of a technical plant, where the system comprises at least one data memory, in which at least one data set, characterizing the operation of the plant, with values of process variables can be stored, and at least one evaluation facility, and the evaluation facility is configured to implement the method in accordance with the above-described embodiment.

The method in accordance with the disclosed embodiments of the invention is suitable in a particularly preferred way for continuous processes, as with the latter, specific operating points of the normal operation are reflected in the node points of the self-organizing map.

The term system can stand for a hardware system such as a computer system consisting of servers, networks and memory units, as well as a software system such as a software architecture or a larger software program. A mixture of hardware and software is also possible, for example, an IT infrastructure, such as a cloud structure with its services. Components of such an infrastructure are normally server, memories, networks, databanks, software applications and services, data directories and data administration. Virtual servers in particular also belong to a system of this kind.

In a further embodiment of the invention, a check is performed, in addition to the data sets of the process variables of the current time interval during which the message has occurred, to determine how often the message has occurred in the past, whereby in the symptom determination historical data sets of historical time intervals containing the same message are also considered. Here, in the self-organizing map, through determination of the smallest distances between the data sets of the past and the data sets of the nodes, several winner nodes are identified, which correspond to an error-free operation of the plant. Accordingly, historical symptoms are additionally also determined in that differences are also formed from the data sets of the historical time intervals for the previously determined winner nodes, with only the differences of process variables that exceed a predetermined threshold value being considered. The process variables that are involved in the previously determined historical symptoms are issued. The consideration of historical time intervals with the same message makes the selection of process variables connected with a message, in particular with an alarm, more robust. If the same process variables are, for example, displayed in connection with a message both for the current time interval and for the historical time intervals after the symptom determination, the plant driver can assume that the same interaction of these process variables always leads to the displayed fault.

In a particularly advantageous embodiment, the robustness of the message diagnosis is increased yet further because the individual messages are also considered in correlation with other messages. Following the occurrence of the message it is first determined in this embodiment whether the message is part of a message chain and how often the message chain has occurred in the past. As the process progresses, one proceeds in exactly the same way for a randomly selected time interval that includes the message chain as in the case of a single message: Following determination of the winner nodes of the self-organizing map for the data sets of the current and historical time intervals including the message chains, the current and historical symptoms are determined and evaluated.

Message chains are messages that often occur in a specific sequence or after the occurrence of repeating patterns in the message archive. Message chains often supply valuable information about operating behavior, as one event is often the consequence of another. On this basis and on the basis of the plant and process knowledge, the operator can then make decisions regarding the further operation of the plant more easily.

EP 3 454 154 A discloses an exemplary automatic method for detecting statistical dependencies between process messages. This method for calculating message chains is established in a way to analyze a given data set (for example, all messages of a message archive within a specific time period) once, and to generate a data set that is closed in itself with results consisting of tables with message chains and matrices with the corresponding transition probabilities between certain messages.

The calculation of message chains can, for example, be performed with a suitable software module. In this case, it is of particular advantage if the evaluation unit of the system in accordance with the invention is connected with an analysis facility for diagnosing messages, which is configured to detect and analyze message chains. Alternatively, for example, to realize simplified data structures, the detection of message chains can be integrated into the diagnosis of messages.

If the symptoms are very similar for all time points of the message chain or the considered time intervals, then the union of the process variables involved in the symptoms can be visualized together with the current symptom. With a greater number of different process variables as a result of the detection of the current and historical symptoms, it is therefore recommended that a clustering of symptoms is performed to realize a reduction of the process variables involved in the symptoms. In a further advantageous embodiment of the invention, a clustering of the symptoms is therefore performed, and subsequently that cluster is selected which, for example, includes a current symptom and those process variables that are involved in the current symptom are issued. Any known methods for clustering can be considered, here.

Within the scope of a further preferred embodiment of the method and system in accordance with the invention, any time intervals can be variably determined or are set according to the process dynamics. This allows the user of the diagnosis application great flexibility during the evaluation of data. If time intervals spanning several time units such as seconds or minutes are selected, then trend curves of the process variables can advantageously be displayed.

In the case of message chains, the time intervals can be selected depending on the identified chain. A time interval can thus, for example, start with the beginning of a message chain, i.e., the time of the first message, and the end of the time interval can stop with the time of the last message. The time period of the analysis can however also be extended to before and after the occurrence of the message chain in accordance with the process dynamics (for example 10 minutes prior to the start of the chain to 5 minutes following the end of the chain).

In another preferred embodiment of the invention, symptoms for a random selection of points in time of the time intervals are determined. This has the advantage that fewer data sets need to be calculated during the symptom determination and a faster determination can thus occur, so that calculation times are reduced.

In another advantageous embodiment, the threshold value for determining the symptom is determined variably. The threshold value for determining a symptom states how large the difference between a data set from the time interval of the message and the data set of a winner node can be at any point in time. If the threshold value is chosen relatively low, then the data sets connected with the message will be too similar to the good data, i.e., the data set stored in the node of the SOM, for normal operation. The symptom determination may then not be meaningful, because any deviations detected from normal operation will be too low. If the threshold value is selected too high, then too many process variables may be considered during symptom generation, so that the message diagnosis is falsified. In the same way as the learning of the nodes of the self-organizing map, the threshold values can be calculated automatically via the data sets of the error-free operation. In addition, with the data sets the respective winner nodes can be calculated and the respective distances between the data sets and the associated winner nodes determined. The distance, resulting in each case for a data set, from its winner node can then be calculated as the threshold value in order to prevent misdiagnoses, each increased by a safety margin of, for example, 5 to 50%, preferably 15%, and predetermined in this way.

In further advantageous embodiments, the diagnosis of messages is refined by combining further information with the symptom determination. Measuring data of comparable historic events can advantageously be illustrated in parallel. If causes and solutions for these are stored in the shift log, then this information will increase the usefulness for the plant driver further. Data of the comparable events in itself will, for example, allow conclusions as to how the process will behave. This can also be very helpful during the diagnosis of messages, such as alarms.

In one embodiment, the system in accordance with the invention is part of a computer system, which is spatially separated from the location of the technical plant. The connected second system then advantageously has the evaluation unit, which can access the components of the technical plant and/or the associated data memories and which is embodied to visualize the analysis results and transfer these to a display unit. In this way, a coupling with a cloud infrastructure can, for example, occur, which increases the flexibility of the overall solution still further.

Local implementations on computer systems of the technical plant can also be of advantage. An implementation, for example, on a server of the process control system, is therefore particularly suitable for safety related processes.

The object described above is correspondingly also solved by a user interface (GUI, graphical user interface), which is displayed on a display unit, and which is configured to display the analysis results of the system in accordance with the disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following the invention will be described and explained in more detail with reference to the figures and with reference to an exemplary embodiment, in which:

FIG. 3 is a flowchart of the method in accordance with the invention.

DETAILED DESCRIPTION OF THE EXEMPLARY EMBODIMENTS

Figure 1:
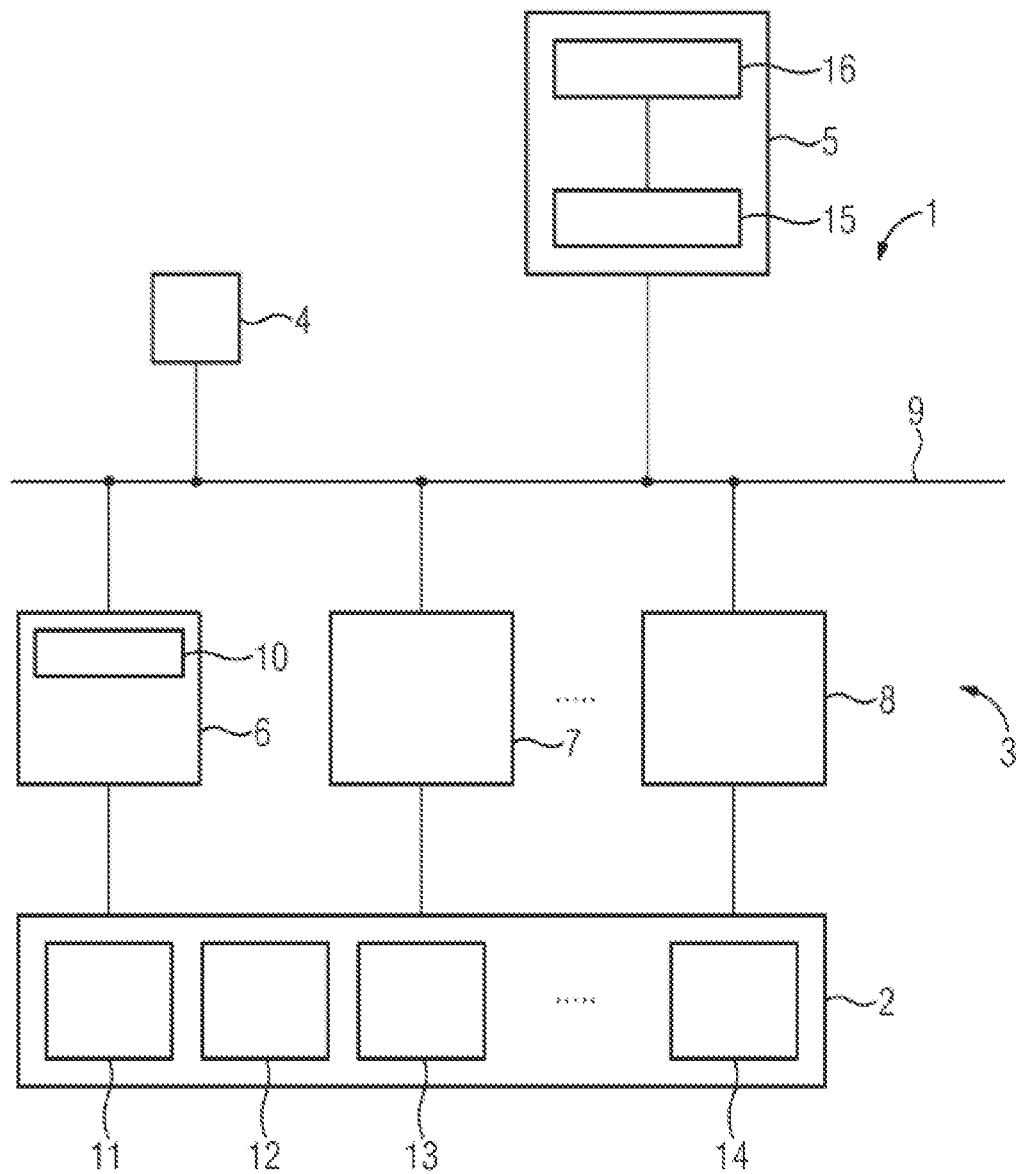
FIG. 1 shows an an exemplary technical plant in accordance with the invention.

FIG. 1 shows a simplified schematic illustration as an example of a process engineering plant 1, in which a process 2 is controlled and/or monitored via an automation system or process control system 3. The process control system 3 includes a planning and engineering tool 4, an operator control and monitoring device 5 and a plurality of automation devices 6, 7, 8, which are connected with each other via a bus system 9 for data communication. The automation devices 6, 7, 8 control the process engineering process 2 in line with automation programs, of which an automation program 10 is, for example, drawn in FIG. 1. The automation program 10, for example, mostly consists of several function components, which can be in interaction with further function components distributed within the automation system 3. Diverse field devices 11, 12, 13, 14 for the process instrumentation are used for controlling the process 2. Measuring transducers serve for recording process variables, such as temperature T, pressure P, flow volume, fill level L, density or gas concentration of a medium. By way of actuators, the process sequence can be correspondingly influenced depending on recorded process variables, for example, specifications of the automation program 10. A control valve, a heater or a pump can be mentioned as examples of actuators. A plurality of data sets characteristic for the operation of the plant are recorded for monitoring the operation of the plant 1 and stored in a data memory 15. By way of evaluation facility 16, the data sets that contain values of process variables at specific points in time are evaluated in order to determine a diagnosis statement and display it to an operator to ensure that possible suitable measures for error rectification can be implemented.

The evaluation facility for implementing the method in accordance with the invention can be advantageously formed as a software function component in an automation environment, which can be interconnected in a graphic user interface of an engineering system with function components of automation programs, and can be loaded, for example, in an automation device. Any deviations from process variables found, which would indicate an error in the plant, are then displayed on a "face plate" for realization of a human/machine interface on an operator control and monitoring device 5 of the automation technology plant. Changes to the self-organizing map, to the threshold values or other parameters can then be implemented by an operator on the graphic user interface of the operator control and monitoring device if desired.

In a particularly advantageous way, the diagnosing system in accordance with the invention for monitoring the operation of a technical plant, in particular the data memory and the evaluation facility, can be implemented in a non-local software environment for cloud-based system monitoring. Data from customer plants is collected with the aid of software agents, aggregated, and sent to a service operation center, where they are stored on a remote service computer. There, in the cloud environment, they are evaluated semi-automatically with the aid of various "data analytics" software applications. If necessary, specially trained experts for the remote service can work highly efficiently on this database. The results of the data analysis can be displayed on a monitor of the remote service computer and/or provided via a SharePoint, so that they can be viewed by the end client, i.e., the operator of the technical plant, for example, via a browser.

The method in accordance with the invention is therefore preferably implemented in software or in a software/hardware combination, so that the invention also relates to a computer program with program code instructions, which can be performed by a computer, for implementing the diagnosis method. In this regard, the invention also relates to a computer program product, in particular a data carrier or a storage medium, with such a computer program, implementable by a computer. As described above, such a computer program can be provided in or loaded into a memory of an automation device, so that the monitoring of the operation of the technical plant is implemented automatically during the operation of the automation device, or the computer program can be provided in or loaded into a memory of a remote service computer with the cloud-based monitoring of a technical plant.

Figure 2:
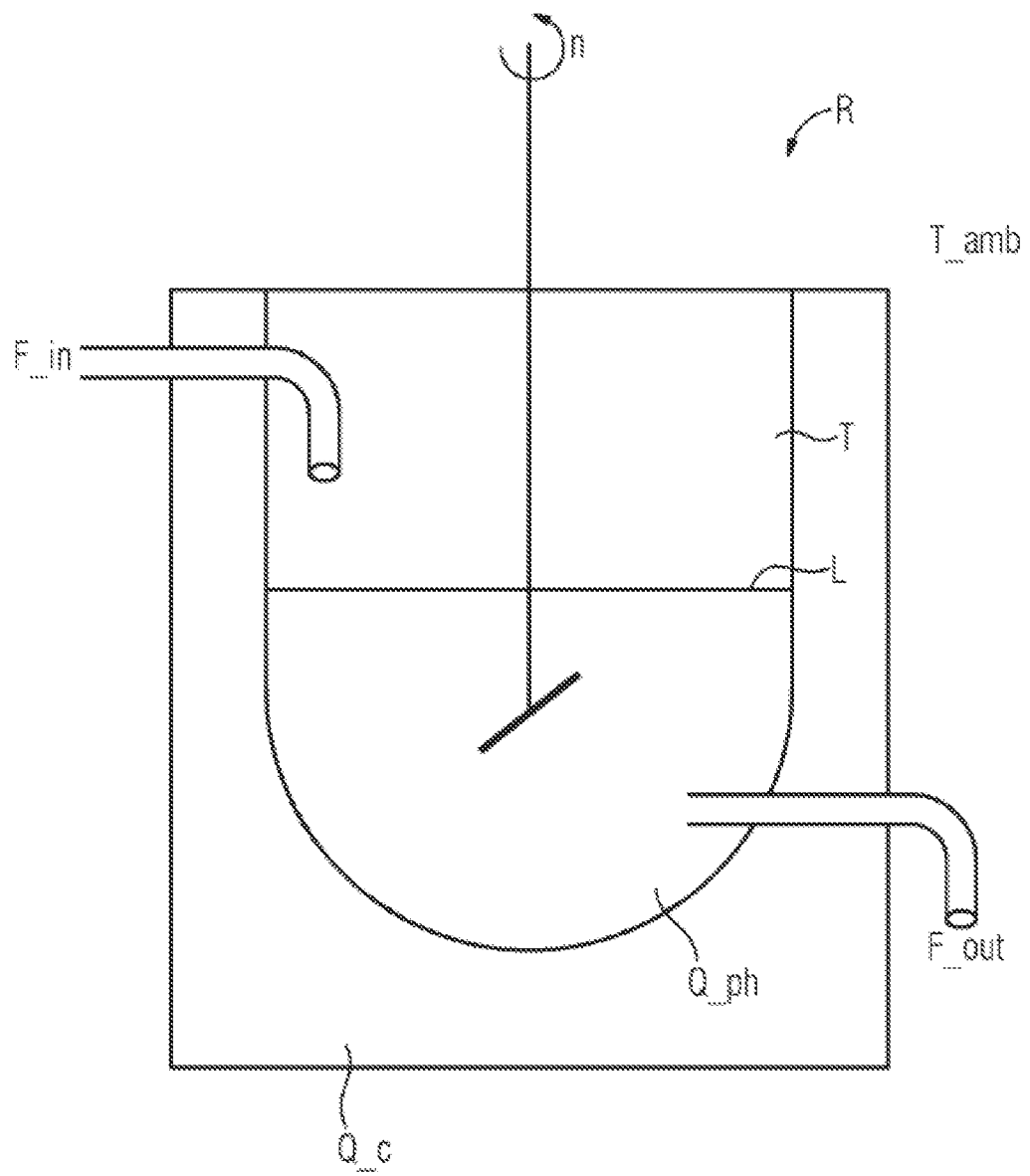
FIG. 2 shows an exemplary process engineering process in accordance with the invention.

With reference to FIG. 2, shown therein is an exemplary embodiment of the diagnosis of messages of a process control system in accordance with the invention.

Examined is a reactor R, in which a liquid mixture is produced in this exemplary embodiment, with an exothermic reaction occurring. Raw material is supplied continuously and a product is discharged. The feed rate is identified with the process variable F_in, the outlet rate with F_out. The fill level L inside the reactor R can fluctuate during the reaction. The mixture is stirred with stirring rotation speed n in the reactor R and an exothermic reaction occurs. The reactor must therefore be cooled. The cooling capacity is identified with Q_c. The external temperature T_amb and the temperature T inside the reactor are continuously monitored. The pH value of the mixture inside the reactor is also monitored as process variable Q_ph. All of the physical measured variables are a data set with values of process variables, which are recorded via corresponding sensors and measuring transducers and stored in a data memory.

It is assumed that a corresponding system or a software component is installed for the diagnosis of the process considered, in which a self-organizing map (SOM) is illustrated. It is further assumed that this self-organizing map has been taught with historical "good data", i.e., with training data sets with values of process variables that characterize an error-free operation of the technical plant. The SOM stores typical values of the process variables that characterize the error-free operation of the technical plant as good values at each node during the learning process. Each node is therefore an n-tuple with predetermined values of n process variables for error-free operation.

It is now further assumed in the exemplary embodiment that an alarm "temperature T in reactor too high" is, for example, displayed on a monitor of the process control system. It would be very unclear for a real process with a plurality of process variables to display all measured variables connected with the process variables. In accordance with the method of the invention, only those measured variables that are causally connected with the occurring alarm or alarms are to be displayed.

Following the alarm, the warning "fill level very high" and the information "air compressor starting" will be displayed. In accordance with the method of the invention, a message chain (M1, M2) is now first identified via a chain analysis with M1="temperature T in reactor too high" and M2="fill level in reactor very high". As the air compressor starts independently from the process as soon as the compressed air supply falls below a certain pressure this would suggest that the message "air compressor starting" is irrelevant for the evaluation. It is then calculated how often the message chain (M1, M2) has occurred in the past. In this exemplary embodiment, it is assumed that the message chain occurred 27 times during the past year. If no message chain had been found, then only the frequency of the alarm would have been determined. A comparison with historical good data now occurs for all time intervals within which the message chain has occurred. The point in time where the message chain starts can, for example, be set as the start of the time interval to be viewed for a message chain. In general, the time intervals can be variably determined or are set to correspond with the process dynamics. The time interval can, for example, be set 10 minutes prior to the start of the message chain and last up to 5 minutes following the end of the chain.

The i+1 "winner nodes" are now determined for all time intervals (here the current time interval t_akt and the 27 historical time intervals dti with i=27) in that the smallest, here Cartesian, distance between the data sets is, for example, determined with the values of the process variables of the i+1=28 time intervals and the n-tuples at the nodes of the SOM. The 28 resulting nodes Kresi are selected. Current and historical symptoms are then determined in that differences from the data sets of the time intervals are generated for the previously determined nodes Kresi, where only the differences of process variables that exceed a predetermined threshold value S_Sym are considered. If the symptoms can be determined clearly with the predetermined threshold value, then a reduction of the threshold value will not be necessary.

In the case in question, the symptoms of the 27 historical data sets differ, which is why clustering is performed. This leads to two clusters, which means that two process situations apparently existed, which historically occurred repeatedly and differ in their symptoms:

Cluster 1:
$\Delta L=+5$, $\Delta T=+10$, $\Delta F\_in=+2$, $\Delta F\_out=0$, $\Delta Q\_c=+3$, $\Delta n=0$, $\Delta Q\_ph=0$, $\Delta T\_amb=0$
and
Cluster 2:
$\Delta L=+6$, $\Delta T=+11$, $\Delta F\_in=0$, $\Delta F\_out=-3$, $\Delta Q\_c=+3$, $\Delta n=0$, $\Delta Q\_ph=0$, $\Delta T\_amb=0$ The behavior within a cluster is similar in each case, which is why the focuses of each cluster are stated as symptoms. Alternatively, a historical case included in the cluster could also be selected.

The current symptom lies in cluster 2 in this example. The process variables of fill level L, temperature T in the reactor, outlet rate F_out and cooling capacity Q_c are therefore displayed. The plant driver can thus conclude from this that a reduced outflow is the cause of the excessively high temperature in the reactor, so that the outflow must for example be increased manually.

FIG. 3 is a flowchart of the method for diagnosing messages (M1, M2, M3) generated during operation of a technical plant 1, where a process engineering process 2 running within the plant 1 is controlled via a process control system 3 and data sets, characterizing the operation of the plant 1, with values of process variables L, T, F, . . . are recorded and are stored in a data memory 15, diagnosis statements about the operation of the plant 1 are determined via the data sets and at least one predetermined, self-organizing map SOM, and n-tuples with predetermined values of process variables L, T, F, . . . for an error-free operation of the plant 1 corresponding to the data sets being stored at nodes K of the self-organizing map.

The method comprises determining a smallest distance between data sets of a current time interval t_akt and data sets of nodes K of the self-organizing map for a current time interval t_akt, within which a message M1 has occurred following occurrence of the message M1, and selecting a corresponding node Kres following occurrence of the message M1, as indicated in step 310.

Next, at least one current symptom is determined to form differences from the data sets of the current time interval t_akt for a previously determined node Kres, as indicated in step 320. In accordance with the method, only the differences of process variables which exceed a predetermined threshold value S_Sym are considered.

Next, process variables L, T, F, . . . involved in at least one previously determined symptom are issued, as indicated in step 330.

Even though the invention has been illustrated and described in detail with reference to the preferred exemplary embodiment the invention is not limited to the disclosed examples. Variations of the same can be deduced by the person skilled in the art without leaving the scope of protection of the invention as defined by the following claims.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for diagnosing messages generated during operation of a technical plant, a process engineering process running within the plant being controlled via a process control system including a planning and engineering tool, an operator control and monitoring device and a plurality of automation devices, which are interconnected via a bus system for data communication, data sets, characterizing the operation of the technical plant, with values of process variables being recorded and stored in a data memory, diagnosis statements about the operation of the technical plant being determined via the data sets and at least one predetermined, self-organizing map, and n-tuples with predetermined values of process variables for an error-free operation of the technical plant corresponding to the data sets being stored at nodes of the self-organizing map, the method comprising:
   determining, during operation of the technical plant, a smallest distance between data sets of a current time interval and data sets of nodes of the self-organizing map for a current time interval, within which a message has occurred following occurrence of the message, and selecting a corresponding node following occurrence of the message;
   determining at least one current symptom to form differences from the data sets of the current time interval for a previously determined node during operation of the technical plant, only the differences of process variables which exceed a predetermined threshold value being considered;
   issuing process variables involved in at least one previously determined symptom during operation of the technical plant; and
   controlling the process engineering process via the process control system and implementing changes to the at least one predetermined, self-organizing map or predetermined threshold value during operation of the technical plant to ensure the error-free operation of the technical plant.

2. The method as claimed in claim 1, following occurrence of the message, the method further comprising:
   determining how often the message has previously occurred;
   determining smallest distances between data sets of historical time intervals and the data sets of the nodes of the self-organizing map for time intervals in the past, within which the message has occurred, selecting corresponding nodes, wherein i>=1;
   determining historical symptoms to form differences from the data sets of the historical time intervals for previously determined nodes, only the differences of process variables which exceed the predetermined threshold value being considered; and
   issuing process variables involved in the previously determined historical symptoms.

3. The method as claimed in claim 2, following the occurrence of the message, the method further comprising:
   determining whether the message forms part of a message chain and how often the message chain has previously occurred;
   determining the smallest distances between the data sets of the time intervals and the data sets of the nodes of the self-organizing map for all time intervals within which the message chain has occurred, and selecting corresponding nodes, wherein i>=1;
   determining current and historical symptoms to form differences from the data sets of the time intervals for the previously determined nodes, only differences of process variables which exceed the predetermined threshold value being considered; and
   issuing process variables which are involved in previously determined symptoms.

4. The method as claimed in claim 2, further comprising:
   performing a clustering of the symptoms;
   selecting a cluster containing at least one current symptom; and
   issuing the process variables which are involved in the at least one current symptom.

5. The method as claimed in claim 3, further comprising:
   performing a clustering of the symptoms;
   selecting a cluster containing at least one current symptom; and
   issuing the process variables which are involved in the at least one current symptom.

6. The method according to claim 1, wherein the time intervals are one of (i) determinable variably and (ii) set in accordance with process dynamics.

7. The method according to claim 1, wherein symptoms are determined for a random selection of time points of the time intervals.

8. The method according to claim 1, wherein the threshold value is variably determinable for determining the symptom.

9. The method according to claim 1, wherein for symptoms of a cluster, historical process variables of the historical time intervals which are involved in the symptoms in this cluster are also issued.

10. The method according to claim 1, wherein information from a shift log of the technical plant with the symptoms is further also issued; and wherein information in a short time interval prior to and/or after the symptoms is also considered.

11. A system for diagnosing messages of a process control system of a technical plant, the process control system including a planning and engineering tool, an operator control and monitoring device and a plurality of automation devices, which are interconnected via a bus system for data communication, the system comprising:
   a data memory in which at least one data set characterizing the operation of the technical plant with values of process variables is storable; and
   an evaluation facility;
   wherein the evaluation facility is configured to:
      determine diagnosis statements about the operation of the technical plant via the data sets and at least one predetermined self-organizing map, n-tuples corresponding to the data sets with predetermined values of process variables for an error-free operation of the technical plant being are stored at nodes of the self-organizing map; and
   wherein following occurrence of a message the evaluation facility is further configured to:
      determine a smallest distance between data sets of a current time interval and data sets of nodes of the self-organizing map for a current time interval, within which a message has occurred following occurrence of the message, and select a corresponding node following occurrence of the message;

determine at least one current symptom to form differences from the data sets of the current time interval for a previously determined node, only the differences of process variables which exceed a predetermined threshold value being considered; and issue process variables involved in at least one previously determined symptom; and wherein a process engineering process is controlled via the process control system and changes are implemented to the at least one predetermined, self-organizing map or predetermined threshold value during operation of the technical plant to ensure the error-free operation of the technical plant.

12. The system as claimed in claim 11, further comprising:

an analysis facility connected to evaluation facility, said analysis facility being configured to calculate and analyze message chains evaluation facility and being configured to:

determine whether the message forms part of a message chain and how often the message chain has previously occurred;

determine the smallest distances between the data sets of the time intervals and the data sets of the nodes of the self-organizing map for all time intervals within which the message chain has occurred, and selecting corresponding nodes, wherein i>=1;

determine current and historical symptoms to form differences from the data sets of the time intervals for the previously determined nodes, only differences of process variables which exceed a predetermined threshold value being considered; and issue the process variables which are involved in the previously determined symptoms.

13. The system according to claim 11, wherein the evaluation facility is further configured to perform a clustering of previously calculated symptoms, select a cluster which contains at least one current symptom, and issue the process variables which are involved in at least one current symptom.

14. The system according to claim 12, wherein the evaluation facility is further configured to perform a clustering of previously calculated symptoms, select a cluster which contains at least one current symptom, and issue the process variables which are involved in at least one current symptom.

15. The system according to claim 11, wherein the evaluation facility is further configured to one of (i) variably determine the time intervals and (ii) set the time intervals in accordance with process dynamics.

16. The system according to claim 11, wherein the evaluation facility is further configured to determine symptoms for a random selection of points in time of the time intervals.

17. The system according to claim 11, wherein the evaluation facility is further configured such that a threshold value is variably determinable for determining the symptom.

18. The system according to claim 11, wherein the evaluation facility is further configured to also issue historical process variables of historical time intervals for symptoms of a cluster.

19. The system according to claim 11, wherein the evaluation facility is connected with a component which comprises a shift log and is connected with an analysis facility which is configured to evaluate information of the shift log of the technical plant in connection with the symptoms and to issue these to the evaluation facility.

20. The system according claim 11, wherein the evaluation facility is further connected with a display device, which is configured to display a selection of at least one of (i) a message or calculated message chain, (ii) a frequency of occurrence of the message or message chain, (iii) current and historical time intervals with a selection of process variables, (iv) process variables that are involved in historical symptoms and (v) process variables that are involved in current symptoms.

21. A non-transitory computer-readable product medium encoded with a computer program which, when executed by a processor of a computer causes messages of a process control system of a technical plant to be diagnosed, the process control system including a planning and engineering tool, an operator control and monitoring device and a plurality of automation devices, which are interconnected via a bus system for data communication, the computer program comprising:

program code for determining, during operation of the technical plant, a smallest distance between data sets of a current time interval and data sets of nodes of the self-organizing map for a current time interval, within which a message has occurred following occurrence of the message, and selecting a corresponding node following occurrence of the message;

determining at least one current symptom to form differences from the data sets of the current time interval for a previously determined node during operation of the technical plant, only the differences of process variables which exceed a predetermined threshold value being considered;

program code for issuing process variables involved in at least one previously determined symptom during operation of the technical plant; and program code for controlling the process engineering process via the process control system and for implementing changes to the at least one predetermined, self-organizing map or predetermined threshold value during operation of the technical plant to ensure the error-free operation of the technical plant.

22. The non-transitory computer-readable medium according to claim 21, wherein the computer-readable medium comprises a data carrier or storage medium.

23. A user interface, which is displayed on a display unit, and which is configured to display analysis results of the system as claimed in 11.

* * * * *